United States Patent [19]

Rokkaku et al.

[11] Patent Number: 4,770,549
[45] Date of Patent: Sep. 13, 1988

[54] CERAMICS BEARING

[75] Inventors: Kazuo Rokkaku; Hiroaki Takebayashi; Kouich Yamauch, all of Osaka, Japan

[73] Assignee: Koyo Seiko Co., Ltd., Osaka, Japan

[21] Appl. No.: 82,517

[22] Filed: Aug. 7, 1987

[30] Foreign Application Priority Data

Aug. 8, 1986 [JP] Japan .................................. 61-187359

[51] Int. Cl.⁴ .............................................. F16C 33/62
[52] U.S. Cl. .................................... 384/492; 384/548; 384/907.1
[58] Field of Search ............... 384/492, 491, 490, 513, 384/548, 565, 569, 907, 907.1, 910, 913

[56] References Cited

U.S. PATENT DOCUMENTS

| 2,158,156 | 5/1939 | Schröder | 384/492 |
| 3,097,897 | 7/1963 | Taylor | 384/492 |
| 3,178,241 | 4/1965 | Braunagel | 384/907 X |
| 4,541,786 | 9/1985 | McLean | 384/527 X |
| 4,634,300 | 1/1987 | Takebayashi et al. | 384/492 X |

Primary Examiner—John Petrakes
Assistant Examiner—Thomas R. Hannon
Attorney, Agent, or Firm—Birch, Stewart, Kolasch & Birch

[57] ABSTRACT

A ceramics bearing comprising an inner ring, and outer ring, and a plurality of rolling elements rollably arranged between the inner and outer rings which is characterized in that the fracture toughness factors $K_{IC}$ (MPam$^{\frac{1}{2}}$) of the inner and the outer rings are identical and that of the rolling elements is greater than that of the inner and the outer rings by about 0.5–2.0.

5 Claims, 1 Drawing Sheet

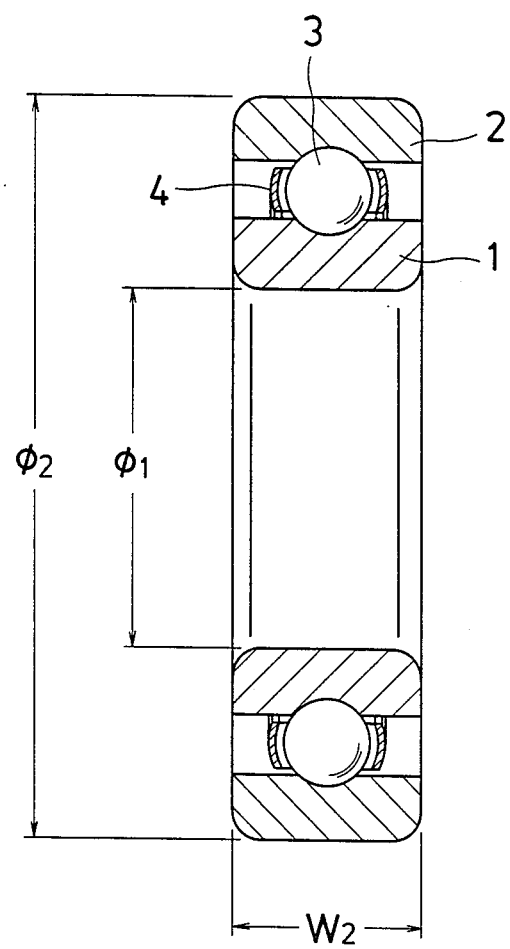
FIG.

CERAMICS BEARING

BACKGROUND OF THE INVENTION

The present invention relates to a ceramic bearing comprising an inner ring, an outer ring, and a plurality of rolling elements rollably arranged between said inner and outer rings all made of ceramics (a sintered compact mainly composed of silicon nitride or Sialon).

A type of ceramics bearing comprising an inner ring, an outer ring, and a plurality of rolling elements all made of ceramics is called "entire ceramics bearing". When a bearing is provided with a retainer for the rolling elements, the retainer may not be composed of ceramics. In the conventional entire ceramics bearing, the characterics of the ceramics of the inner ring, the outer ring, and the rolling elements are controlled the same, so as to afford a suitable ceramics bearing.

However, the conventional entire ceramics bearing is not suitable for, for example, a diesel engine because the bearing of the diesel engine is used at high temperature and high speed, so that the bearing cannot resist a load and its lifetime is rather short. So long as the entire ceramics bearing comprises the inner ring, the outer ring and the rolling elements with the same material characterics, the rolling elements may exfoliate and fracture rather earlier when used at the high temperature and high speed. In developing the materials of the ceramics, there are considered the density, the thermal conductivity, the special heat, the bearing strength, the compressive strength, the coefficient of line extension, the longitudinal modulus of elasticity, and so on. However, the various considerations may be very complex and are not suitable for the elementary criteria of determination.

SUMMARY OF THE INVENTION

Accordingly, it is an object of the present invention to provide an improved ceramics bearing for sustaining heavy weight with long lifetime by selecting unique criteria.

It is another object of the present invention to provide an improved ceramics bearing for resisting to heavy weight for a long time by selecting the materials of the ceramics bearing in view the fracture toughness factor $K_{IC}$ having the units MPam$^{\frac{1}{2}}$ wherein "m" represents mega, "Pa" represents Pascal, and "m" represents meter.

Briefly described, in accordance with the present invention, a ceramics bearing comprises an inner ring, an outer ring, and a plurality of rolling elements rollably arranged between said inner and outer rings all made of ceramics, such that the fracture toughness factors $K_{IC}$(MPam$^{\frac{1}{2}}$) of the inner ring and the outer ring are substantially similar and that the fracture toughness factor $K_{IC}$(MPam$^{\frac{1}{2}}$) of the rolling elements is set larger about 0.5–2.0 than that of the inner and the outer rings. Preferably, the fracture toughness factor $K_{IC}$(MPam$^{\frac{1}{2}}$) of the inner and the outer rings is in the range of about 5.0–8.0.

BRIEF DESCRIPTION OF THE DRAWINGS

The present invention will become more fully understood from the detailed description given hereinbelow and the accompanying drawings which are given by way of illustration only, and thus are not limitative of the present invention. The FIGURE shows a cross-sectional view of a ceramics bearing according to the present invention.

DESCRIPTION OF THE PREFERRED EMBODIMENTS

According to the present invention, the fracture toughness factor $K_{IC}$(MPam$^{\frac{1}{2}}$) is a factor for selecting the materials of the ceramics sustaining heavy weight for a long time. Normally, the solid is deformed with external stress. When the external stress becomes greater than a limit, the solid fractures. The fracture of the solid occurs when the atomic bonding is broken out and a new surface of the solid is produced. The fracture strength of the material of the solid without any defects depends upon the atomic bonding.

While a metallic bond between atoms is formed in a metal, the bond between atoms in ceramics is an intermediate between an ionic bond and a covalent bond. The difference in the bonds between the metal and the ceramics causes the different mechanical characterics between them. Upon external stress, the metal, which is malleable, first causes an elastic deformation and, then, plstic deformation, and, finally, ductility fracture. On the contrary, upon external stress, cracks appear in the ceramics even within its limitation of elasticity to thereby cause brittle fracture. Fracture toughness is considered as a measure of a material showing the brittle fracture, such as ceramics, to resist to a fracture. Within stress to suffice to fracture a material, a value of fracture toughness is represented with a factor $K_{IC}$(MPam$^{\frac{1}{2}}$).

$$K_{IC} = \sqrt{2E\gamma}$$

Where:
E is Young's modulus
$\gamma$ is fracture energy

While Young's modulus E is dependent upn a material, tough ceramics should have large fracture energy $\gamma$. As compared with the metal, $K_{IC}$(MPam$^{\frac{1}{2}}$) of the ceramics is very small.

The FIGURE shows a cross-sectional view of a ceramic bearing according to the present invention. The ceramic bearing comprises an inner ring 1, an outer ring 2, a plurality of balls 3 as rolling elements rollably arranged between the inner ring 1, and the outer ring 2, and a retainer 4. The inner ring 1, the outer ring 2, and the balls 3 are all composed of ceramics (a sintered compact mainly composed of silicon nitride ($Si_3N_4$)).

As described above, the fracture toughness factor $K_{IC}$(MPam$^{\frac{1}{2}}$) is a factor for selecting the material. $K_{IC}$(MPam$^{\frac{1}{2}}$) of the inner ring 1 is $K_{IC}$(N). $K_{IC}$(MPam$^{\frac{1}{2}}$) of the outer ring 2 is $K_{IC}$(G). $K_{IC}$(MPam$^{\frac{1}{2}}$) of the balls 3 is $K_{IC}$(T). The present invention satisfies the following relationships.

$$K_{IC}(N) \approx K_{IC}(G)$$

$$K_{IC}(N) + 0.5 \leq K_{IC}(T) \leq K_{IC}(N) + 2.0$$

$$K_{IC}(G) + 0.5 \leq K_{IC}(T) \leq K_{IC}(G) + 2.0$$

More particullaly, in accordance with a preferred embodiment of the invention, the following conditions are satisfied.

$K_{IC}(N) = 5.1$
$K_{IC}(G) = 5.1$
$K_{IC}(T) = 5.6$

That is, $K_{IC}(T) = K_{IC}(N) + 0.5$, wherein $= K_{IC}(G) + 0.5$ $K_{IC}(N)$ and $K_{IC}(G)$ should be in the range of about 5.0–8.0. In the preferred embodiment, the inside diameter $\phi_1$ of the inner ring 1 is about 30 mm and the outside diameter $\phi_2$ of the outer ring 2 is about 62 mm while the width $W_2$ of the outer ring 2 is about 16 mm. A comparative example is examined in which $K_{IC}(MPam^{\frac{1}{2}})$ of the inner ring 1 and the outer ring 2 is identical, about 5.1, with the same scale to the preferred embodiment. Our experiment indicates that the relative value for resisting a load in the comparative example is about 1 while the relative value for resisting a load in the preferred embodiment is about 1.5. The load resisting is increased by 1.5 times.

With respect to the lifetime, when a load of about 400 kgf is examined at a revolution speed of about 9000 rpm, the lifetime of the comparative example is about 26 hours, but the lifetime of the preferred embodiment is about 47 hours. The lifetime is increased by 1.8 times.

In another preferred embodiment of present invention, another type of bearing made of Sialon with the same scale is examined.

(1) $K_{IC}(MPam^{\frac{1}{2}})$ of all the inner ring 1, the outer ring 2, and the balls 3 is set 6.5.

(2) While $K_{IC}(MPam^{\frac{1}{2}})$ of the inner ring 1 and the outer ring 2 is set at 6.5, and $K_{IC}$ of the ball 3 is set at 8.0.

The load resistivity of case (1) is up to about 600 Kgf, in which the balls 36 expoliates. In contrast, the load resisting of case (2), as related to the present invention, is about 800 Kgf with a lifetime of over 30 hours, in which the inner ring 1 and the outer ring 2 expoliate as well as the balls 3.

As described above, the ceramic bearing of the present invention is such that $K_{IC}(MPam^{\frac{1}{2}})$ of the inner and the outer rings is identical while $K_{IC}(MPam^{\frac{1}{2}})$ of the balls is greater than $K_{IC}(MPam^{\frac{1}{2}})$ of the rings by about 0.5–2.0. The inner ring and the outer ring expoliate as well as the balls, thereby increasing the load resistivity and the lifetime.

Below a difference of 0.5, an effective advantage for resisting a load for a long time cannot be attained while over a difference of 2.0, the inner ring or the outer ring may be destroyed with the balls being safety.

While only certain embodiments of the present invention have been described, it will be apparent to those skilled in the art that various changes and modifications may be made therein without departing from the spirit and scope of the present invention as claimed.

What is claimed is:

1. A ceramics bearing comprising an inner ring means, an outer ring and a plurality of rolling elements rollably arranged between said inner and outer rings all composed of ceramics comprising:

the fracture toughness factors of said inner ring and said outer ring being substantially identical; and the fracture toughness factor of said rolling elements being greater than that of said inner ring and said outer ring means by about 0.5–2.0.

2. The ceramics bearing as set forth in claim 1, wherein the fracture toughness factor of said inner ring and said outer ring is in the range of about 5.0–8.0.

3. The ceramics bearing as set forth in claim 1, wherein said rolling elements are balls.

4. The ceramics bearing as set forth in claim 1, wherein said ceramics material is a sintered compact mainly composed of silicon nitride, and the fracture toughness factor of said inner and outer ring is 5.1 and the fracture toughness factor of said rolling elements is 5.6.

5. The ceramics bearing as set forth in claim 1, wherein said ceramics material is Sialon and the fracture toughness factor of said inner and outer ring is 6.5 and the fracture toughness factor of said rolling elements is 8.0.

* * * * *